Sept. 10, 1929.    T. M. ELFVING    1,727,758
REFRIGERATION
Filed June 10, 1927
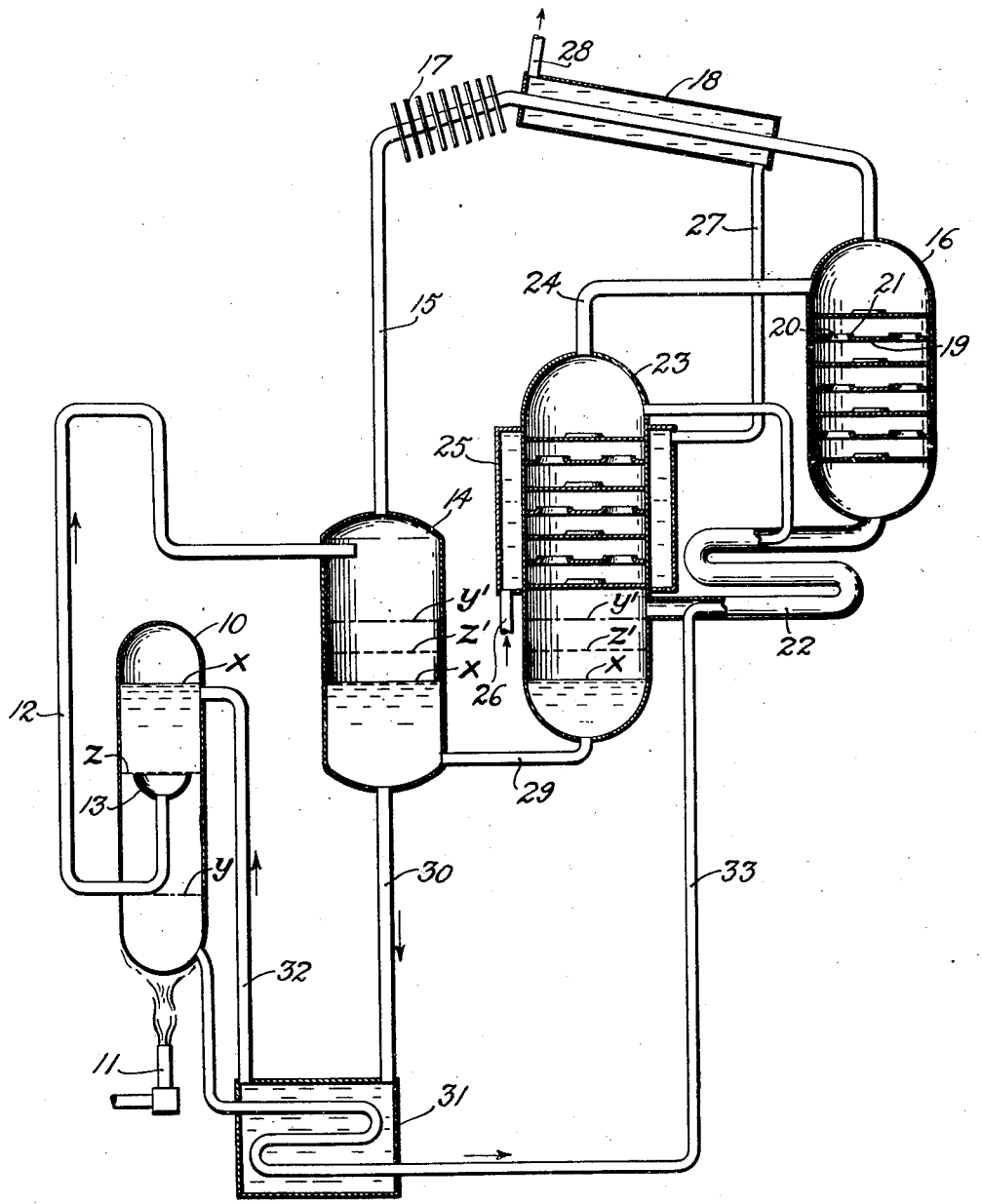
INVENTOR
BY
His ATTORNEY Patented Sept. 10, 1929.

1,727,758

UNITED STATES PATENT OFFICE.

THORE MARTIN ELFVING, OF STOCKHOLM, SWEDEN, ASSIGNOR TO ELECTROLUX SERVEL CORPORATION, OF NEW YORK, N. Y., A CORPORATION OF DELAWARE.

REFRIGERATION.

Application filed June 10, 1927, Serial No. 197,775, and in Germany December 6, 1926.

The invention relates to the art of refrigeration and particularly to absorption refrigerating apparatus and still more particularly to apparatus of this type wherein circulation of fluid media is effected by forces generated within the system.

One of the objects of the invention is to provide improved means for promoting the circulation of one or more of the fluids employed in an absorption apparatus of the above type. This as well as other objects and advantages of the invention will be apparent from the accompanying drawing and following description.

The drawing is an elevational cross-sectional view of apparatus for carrying out the invention.

Referring to the drawing, reference character 10 designates a generator which is arranged to be heated in any suitable manner as, for instance, by the gas burner 11. A conduit 12 terminates in an upwardly opening funnel-shaped member 13 within the more central part of generator 10. Conduit 12 extends downwardly for some distance within generator 10 and thence passes through the wall thereof, then extends upwardly for at least a given distance as will be explained later and finally communicates with the upper part of an auxiliary or intermediate vessel 14. Vessel 14 is situated so that it is partially above and partially below the top of generator 10 and so that liquid may flow by gravity therefrom into the generator. A conduit 15 communicates with the upper part of vessel 14 and extends upwardly for some distance and thence downwardly and communicates with the upper part of an evaporator 16. A portion of the upwardly extending part of conduit 15 is provided with radiating fins 17 while the downwardly extending portion of the conduit passes through a water jacket 18 or in heat exchange relation with some other cooling means.

Evaporator 16 is a closed cylindrical member in which is placed a series of distributing disks 19. Disks 19 are formed with apertures 20 surrounded by raised rims 21. A conduit 22 connects the lower part of evaporator 16 with an absorber 23 at a point some distance above the bottom thereof. A conduit 24 connects the upper part of absorber 23 with evaporator 16.

Absorber 23 is partially surrounded by a water jacket 25. Cooling water is admitted to jacket 25 through a conduit 26 and is discharged therefrom through a conduit 27 to water jacket 18 and is finally discharged through a conduit 28.

The lower part of absorber 23 is connected to the lower part of intermediate vessel 14 by means of a conduit 29, the arrangement being such that liquid may flow by gravity from the absorber to vessel 14. A conduit 30 communicates with the lower part of vessel 14 and extends downwardly to a heat exchanger 31. A conduit 32 connects heat exchanger 31 with the upper part of generator 10. Conduit 32 should extend downwardly from its point of communication with generator 10 for at least a given distance, as will be explained later. A conduit 33 communicates with the lower part of generator 10, is brought into heat exchange relation with conduit 22 and communicates with the upper part of absorber 23.

The mode of operation of the apparatus will now be outlined:

Assume that the apparatus is filled with the proper quantity of fluids but that no heat has been applied to generator 10. In this case, generator 10, auxiliary vessel 14, absorber 23 and conduits communicating with these vessels are filled to the level $x$ with a solution consisting of a refrigerant, for instance ammonia, dissolved in an absorbent, for instance water. Upon the application of heat from gas burner 11, ammonia vapor passes out of solution and builds up an excess pressure in the generator. This increase in pressure depresses the liquid level in generator 10, the top of the generator being closed, and forces liquid therefrom upwardly in conduits 12 and 33 and through conduit 32, heat exchanger 31 and conduit 30 into vessel 14 and through conduit 29 into absorber 23. These displaced columns of liquid balance the excess pressure in the generator. As the pressure continues to increase, the liquid level in generator 10 falls below the upper end of conduit 32. Obviously, no more liquid can be forced into this conduit but the liquid already therein is displaced into vessel 14 and absorber 23. Conduit 32 must extend down sufficiently far so that the liquid will never be entirely displaced therefrom for, if this were to occur, vapor would immediately pass upwardly through conduit 30, the excess pressure in the generator would become unbalanced and an equalization of pressure would occur. Upon continued increase in pressure, the level falls to $z$ in generator 10 and rises to $z'$ in vessel 14 and absorber 23. As the level falls still further, the top of funnel shaped member 13 is above the liquid level in the generator and hence no more liquid may pass therethrough from the generator but the liquid already in member 13 and conduit 12 balances the pressure in the generator. The vertical length of conduit 12 must be great enough so that it may contain a column of liquid long enough to balance this pressure. The level in generator 10 falls further and the liquid forced out of the generator passes through conduit 33 and is discharged into the upper part of absorber 23. When the level has fallen to $y$ in the generator, the vapor passes around the lower bend in conduit 12 and forces the liquid from this conduit into vessel 14. The open passageway thus formed between generator 10 and vessel 14 allows an equalization of pressure to take place throughout the apparatus and the liquid which has been displaced from the generator into vessel 14 and absorber 23 flows by gravity back to the generator through conduits 29, 30 and 32 and heat exchanger 31. This liquid entering generator 10 forces the ammonia vapor therefrom through conduit 12 to vessel 14.

The ammonia vapor and some entrained water vapor passes from vessel 14 through conduit 15. In that upwardly extending portion of conduit 15 which is provided with radiating fins 17, the temperature of the ammonia and water vapor is reduced sufficiently to effect the condensation of the water vapor and the liquid thus formed runs back to vessel 14. In that downwardly extending portion of conduit 15 which passes through water jacket 18 the temperature of the ammonia vapor is further reduced and the ammonia is liquefied. The liquid ammonia thus formed flows into the upper part of evaporator 16.

In the evaporator the ammonia is distributed over disks 19 and comes in intimate contact with a gas inert with respect to ammonia, for instance hydrogen, which is introduced through conduit 24. The ammonia evaporates in the presence of and diffuses into the hydrogen in known manner and the accompanying temperature decreased produces refrigeration. As the vaporous mixture of ammonia and hydrogen thus formed has a greater specific weight than the relatively pure hydrogen which is admitted near the top, the mixture passes downwardly through the evaporator and through conduit 22 to absorber 23. In conduit 22 the mixture comes in heat exchange relation with the liquid in conduit 33 and serves to cool that liquid.

In absorber 23 the mixture comes in intimate contact with water which has but little ammonia in solution and which is introduced through conduit 33. The ammonia vapor is absorbed by the water while the comparatively light hydrogen which is not absorbed passes upwardly through absorber 23 and through conduit 24 to the upper part of evaporator 16. The heat which results from the absorption is carried away by the cooling water which circulates through water jacket 25.

The circulation of the absorbing medium between the generator and the absorber was previously described. As the ammonia is driven out of solution in generator 10, the weak solution is forced through conduit 33 to the upper part of absorber 23. In the absorber the weak solution becomes strengthened by the absorption of ammonia. The strong solution remains in the absorber or passes into vessel 14 where it remains until the liquid level in the generator has fallen to $y$, when an equalization of pressure occurs and the strong solution passes through conduit 30, heat exchanger 31 and conduit 32 to generator 10. Its entrance into generator 10 displaces vapor therefrom and forces it through conduit 12 until the liquid level has risen to the level $z$, whereupon liquid passes into member 13 and the pressure again begins to increase in the generator. Thus absorption medium is alternately forced from the generator to a higher level in the absorber and auxiliary vessel 14 and then allowed to run back by gravity to the generator. In this way, forces generated entirely within the apparatus are utilized to circulate the fluids used in the refrigerating process.

While there is shown and described a more or less specific form of the invention, it is to be understood that variations are contemplated within the scope of the invention.

What is claimed is:

1. Absorption refrigerating apparatus comprising a generator, an absorber, a condenser, an evaporator, an intermediate vessel situated to allow liquid to flow by gravity from the absorber to said vessel and by gravity from said vessel to the generator, and means for periodically creating an excess of pressure in said generator comprising conduit means for conveying vapor from the generator to said vessel connected to the generator so as to form a conduit for periodic flow of liquid from the generator to the vessel on changes of liquid level in the generator and to periodically form liquid columns interposed between the generator and condenser to prevent flow of vapor therebetween.

2. Absorption refrigerating apparatus comprising a generator, an absorber, a condenser, an evaporator, an intermediate vessel situated to allow liquid to flow by gravity from the absorber to said vessel and by gravity from said vessel to the generator, a conduit connecting the upper part of said vessel with the condenser, and means to periodically create an excess pressure in said generator comprising conduit means for conveying vapor from the generator to said vessel connected to the generator so as to form a conduit for periodic flow of liquid from the generator to the vessel on changes of liquid level in the generator and to periodically form liquid columns interposed between the generator and condenser to prevent flow of vapor therebetween.

3. Absorption refrigerating apparatus comprising a generator, an absorber, a condenser, an evaporator, an intermediate vessel situated to allow liquid to flow by gravity from the absorber to said vessel and by gravity from said vessel to the generator, means operating under the influence of factors within the apparatus for circulating an auxiliary agent through the absorber and evaporator in the presence of which the refrigerant evaporates, conduits connecting the generator with the absorber and with said vessel, the absorber with said vessel and said vessel with the condenser, and means for periodically creating an excess pressure in the generator comprising a conduit connecting said generator with said vessel adapted to hold a liquid column.

4. Absorption refrigerating apparatus comprising a generator, an absorber, a condenser, an evaporator, an intermediate vessel situated to allow flow of liquid by gravity from the absorber to said vessel and to allow flow of liquid by gravity from said vessel to said generator, a conduit connecting said generator with said vessel, and means dependent on height of liquid level in said generator for alternately forcing a liquid column and vapor into said vessel.

5. Absorption refrigerating apparatus comprising a generator, an absorber, a condenser, an evaporator, an intermediate vessel situated to allow flow of liquid by gravity from the absorber to said vessel and to allow flow of liquid by gravity from said vessel to said generator, a conduit connecting said generator with said vessel, and means dependent on height of liquid level in said generator for alternately forcing a liquid column and vapor from the generator.

6. Absorption refrigerating apparatus comprising a generator, an absorber, a condenser, an evaporator, an intermediate vessel situated to allow flow of liquid by gravity from the absorber into said vessel and to allow flow of liquid by gravity from said vessel into the generator, said generator being closed at the top, a conduit connecting an upper portion of the generator with said vessel, a conduit connecting a lower portion of the generator with an upper portion of the absorber, and means dependent on height of liquid level in said generator for alternately forcing a liquid column and vapor into said vessel.

7. Absorption refrigerating apparatus comprising a generator, an absorber, a condenser, an evaporator, an intermediate vessel situated to allow flow of liquid by gravity from the absorber into said vessel and to allow flow of liquid by gravity from said vessel into the generator, said generator being closed at the top, a conduit connecting an upper portion of the generator with said vessel, a conduit connecting a lower portion of the generator with an upper portion of the absorber, means dependent on variations of liquid level in said generator for alternately forcing a liquid column and vapor from said generator into said vessel and a vapor connection between said vessel and the condenser.

8. Absorption refrigerating apparatus comprising a generator, an absorber, a condenser, an evaporator, an intermediate vessel situated to allow flow of liquid by gravity from the absorber to said vessel and to allow flow of liquid by gravity from said vessel to said generator, a conduit connecting said generator with said vessel, and means dependent on height of liquid level in said generator for alternately forcing a liquid column and vapor into said vessel, said means comprising a conduit opening at an intermediate portion of the generator, extending downwardly, horizontally and upwardly above the top of the generator and connected to said vessel.

9. Absorption refrigerating apparatus comprising a generator, an absorber, a condenser, an evaporator, an intermediate vessel situated to allow flow of liquid by gravity from the absorber to said vessel and to allow flow of liquid by gravity from said vessel to said generator, a conduit connecting said generator with said vessel, means dependent on height of liquid level in said generator for alternately forcing a liquid column and vapor into said vessel, said means comprising a conduit opening at an intermediate portion of the generator and connected to said vessel and means to convey vapor from said vessel to said condenser.

10. That improvement in the art of refrigerating through the agency of an absorption system including a generator, an evaporator, an intermediate vessel connected between the generator and evaporator, and an absorber, which consists in periodically closing communication between the generator and the intermediate vessel by liquid, generating an excess pressure in the generator against the closing liquid, forcing liquid from the generator to the absorber due to the excess pressure, equalizing the pressure by discharging the closing liquid into the intermediate vessel and returning the closing liquid from the intermediate vessel to the generator.

11. Refrigerating apparatus comprising a generator, a condenser, an evaporator, an absorber and an intermediate vessel interconnected to form a system comprising a conduit for conducting vapor from said intermediate vessel to said condenser constituting the sole means of supply of vapor to the condenser for condensation, a conduit connecting the generator with said intermediate vessel adapted, on variation of pressure and liquid level in the generator, to alternately conduct vapor and liquid from the generator to the intermediate vessel and a conduit for flow of liquid from the intermediate vessel to the generator, the arrangement being such that a rise of pressure in the generator above a given value causes liquid to pass from the second mentioned conduit into the intermediate vessel.

12. Refrigerating apparatus comprising a generator, a condenser, an evaporator, an absorber and an intermediate vessel interconnected to form a system comprising a conduit for conducting vapor from said intermediate vessel to said condenser constituting the sole means of supply of vapor to the condenser for condensation, a conduit connecting the generator with said intermediate vessel adapted, on variation of pressure and liquid level in the generator, to alternately conduct vapor and liquid from the generator to the intermediate vessel and a conduit for flow of liquid from the intermediate vessel to the generator, the arrangement being such that rise of pressure in the generator causes liquid to enter the second mentioned conduit and lifts absorption liquid and conducts the absorption liquid to the absorber and such that a rise of pressure in the generator above a given value causes liquid to pass from the second mentioned conduit into the intermediate vessel to equalize pressure and permit liquid to flow into the generator from the absorber.

13. Refrigerating apparatus comprising a generator, a condenser, an evaporator, an absorber and an intermediate vessel interconnected to form a system comprising a conduit for conducting vapor from said intermediate vessel to said condenser constituting the sole means of supply of vapor to the condenser for condensation, a conduit connecting the generator with said intermediate vessel adapted, on variation of pressure and liquid level in the generator, to alternately conduct vapor and liquid from the generator to the intermediate vessel and having a U-shaped bend therein and a conduit for flow of liquid from the intermediate vessel to the generator, the arrangement being such that a rise of pressure in the generator above a given value causes liquid to pass from the second mentioned conduit into the intermediate vessel.

14. Refrigerating apparatus of the absorption type comprising a generator, a condenser, an evaporator, an intermediate vessel and connections therebetween forming a first major uni-directional flow cycle for a cooling agent including the generator, condenser, evaporator and absorber, a second local uni-directional flow cycle for an auxiliary agent including the evaporator and absorber, a third local uni-directional flow cycle for absorption liquid including the generator and the absorber and a separate fourth uni-directional flow cycle for flow of sealing fluid comprising the generator and intermediate vessel.

In testimony whereof I affix my signature.
THORE MARTIN ELFVING.